Patented Jan. 20, 1953

2,626,284

UNITED STATES PATENT OFFICE 2,626,284

AQUEOUS CAUSTIC TREAT OF ISO-OCTYL ALCOHOL

Warren M. Smith, Baton Rouge, La., assignor to Standard Oil Development Company, a corporation of Delaware No Drawing. Application September 17, 1949, Serial No. 116,403

1 Claim. (Cl. 260—643)

The present invention relates to the treatment of alcohols, particularly with respect to purification of the finished alcohol product and improvement of quality including storage stability. More specifically, the present invention is directed toward the purification of alcohol products obtained by the catalytic reaction of olefins with hydrogen and carbon monoxide to give a reaction mixture predominantly made up of carbonyl compounds followed by hydrogenation in the presence of a sulfur-insensitive catalyst under conditions conducive to obtain substantially complete conversion of carbonyl groups to alcoholic hydroxyl groups.

This invention is directed to a highly specific and extremely useful treatment which has been found to give pure alcohol products from crude hydrogenated materials derived from synthetic oxonation and hydrogenation processes. It consists primarily of a caustic treatment under critical conditions of temperature and time, such that certain ester and acid impurities are essentially completely removed from the alcohol (e. g. the esters of formic acid). These critical conditions must be regulated quite closely in order to obtain the maximum good results possible from the process.

The synthesis of oxygenated organic compounds from olefinic compounds and mixtures of carbon monoxide and hydrogen under suitable conditions is well known in the art. The olefinic starting material is reacted in the liquid state with carbon monoxide and hydrogen in the presence of a metal catalyst, usually an iron group metal catalyst, such as a suitable cobalt compound to form, in a first stage, organic carbonyl compounds such as aldehydes and ketones having one carbon atom more per molecule than the olefinic feed material together with some condensed higher molecular weight products such as acetals, hemiacetals, and esters. The carbonyl compounds which predominate in the product are then subjected to hydrogenation in a second stage to produce the corresponding alcohols, usually in a rather impure state.

Practically all types of organic compounds having an olefinic double bond may be used as starting materials to the first or oxygenation stage including aliphatic olefins and diolefins, cycloolefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable reaction conditions include temperatures of about 150°–450° F., pressures of about 100 to 300 atm., $H_2:CO$ ratios of about 0.5–2.0:1, liquid feed rates of about 0.2–2 V/V/hr. and gas feed rates of about 1000–45,000 standard cu. ft. of $H_2+CO$ per barrel of liquid feed.

The hydrogenation stage may be operated at conventional hydrogenation conditions which include temperatures, pressures, gas and liquid feed rates approximately within the ranges specified above for the first stage. Various known types of hydrogenation catalysts such as nickel, tungsten, molybdenum, their oxides and sulfides and others may be used. These catalysts may be supported on a suitable carrier such as charcoal or other inert support. The liquid product from the hydrogenation stage is worked up by distillation to separate the desired alcohols from unconverted olefinic feed material, unhydrogenated carbonyl compounds, hydrocarbons, and condensed higher molecular weight products formed in the process.

The over-all carbonylation or so-called "Oxo" reaction as outlined above, provides a particularly effective method for preparing valuable primary alcohols, particularly of the $C_4$ to $C_{12}$ range, which find large markets as intermediates for detergents and plasticizers.

Serious difficulties have been encountered in the hydrogenation stage as a result of sulfur poisoning of the hydrogenation catalyst, when the catalysts used are those such as nickel and others which are sulfur sensitive. The most readily available olefinic feed stocks for the oxygenation reaction are the hydrocarbon streams derived from petroleum refinery sources and frequently have sulfur contents as high as 0.1% or even higher. Furthermore, there are a variety of other ways in which sulfur may be introduced into the alcohol product during oxonation and hydrogenation. For instance, the acids used to form the metal oxonation catalyst for the purpose of introducing the metal into the reactor as the naphthenate, stearate, or oleate, will usually be found to contain small amounts of sulfur contaminants, particularly when the acids themselves are of petroleum origin. The synthesis gas used in the oxygenation zone which is primarily a mixture of carbon monoxide and hydrogen also may contain sulfur impurities and in fact the gaseous reactions employed in both stages of the Oxo reaction usually contain at least traces of sulfur impurities.

One of the largest and most important uses developed for the synthetic alcohol products is that of producing esters suitable for plasticizers, by reaction with both aliphatic and aromatic acids or anhydrides including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers. These include alcohols of from $C_4$ to $C_{16}$ range such as the butyl alcohols, the octanols and the nonanols. Certain of the higher molecular weight oxo alcohols are useful in the production of detergents.

These esters are prepared in standard type esterification equipment employing reactors made of stainless steel or other metal or, in some cases, in glass-lined reaction vessels.

In a number of instances, particularly when the esters were produced in reactors having metallic surfaces such as stainless steel exposed to the reacting mixtures, the products were found to be deficient as to the standards required for plasticizers, either in such characteristics as odor, color, and plasticizing qualities as the poor weathering tendency of the resins and plastics in which such plasticizers are used. These undesirable characteristics are believed to be caused by various impurities present in the alcohol product and especially by certain acid and ester products in the alcohol, although other materials can also affect ester color and odor, including sulfur impurities, polymerized and condensed higher molecular weight impurities, as well as unreduced carbonyl compounds, unsaturated aldehydes, and other non-alcoholic compounds. Some alpha-beta unsaturated carbonyl compounds are believed to be formed during the oxo reaction and are especially bad as color formers.

In general, the sulfur impurities in the synthetic oxo alcohols are in the form of organically combined sulfur, although a small amount of hydrogen sulfide is also present. It would seem that at least the major portion of all types of acids and ester products and the carbonyl compounds should be removed to yield the best ester plasticizer products, particularly when the ester is manufactured in stainless steel equipment and unreacted or excess alcohol is recycled to the esterification zone.

In typical alcohol recycle esterification operations, a 20% molal excess of alcohol is used based on the phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus undesirable color and odor characteristics have the opportunity to build up during the recycle stages to a point at which they must be purged from the system before continuing the recycling operation. This presents impurity problems which occur even though the actual reaction is carried out in corrosion resistant or glass-lined equipment.

There are regularly used a number of modified esterification procedures. Two of the main ones which are widely used for preparation of the dioctyl phthalate ester include the high temperature method in which the one mole of phthalic anhydride is heated with approximately 2.4 moles of octyl alcohol and the ester is recovered by distilling, first, the unreacted alcohol and anhydride then finally the ester under reduced pressure and the catalytic method in which benzene sulfonic acid or a similar type material may be employed to give catalytic esterification at a lower temperature. The color degradation of isooctyl alcohol during esterification has also been found to be a function of time and completeness of esterification, increasing linearly with time. It is believed that one type of reaction may generally be more sensitive to certain specific impurities than the other type, as for example, the acid-catalyzed method seems more sensitive to carbonyl type compounds. The highly purified isooctyl alcohol products, such as those made from alcohol purified through the borate ester or prepared over a sulfur sensitive metallic hydrogenation catalyst, show practically no color degradation in any method of esterification. The ester color can be expressed in terms of a Hazen ester color number, a high number value indicating a darkened, low quality ester product. This standard test for ester color is described in the literature and reported as A. S. T. M. D268–46.

The odor problem in both finished alcohol and ester products has also proved difficult, some distilled products have a kerosene type or petroleum odor, while others have a distinct aldehydic odor. Ester products made from very pure alcohol by the high temperature method frequently carry a sweet or burned odor.

Various methods have been studied in order to solve these quality difficulties. However, no good method has previously been known for effecting purification of the oxo alcohol product to remove esters and acidic impurities and thereby give high quality ester products producing an alcohol by esterification of organic acids.

In following this invention a caustic solution is contacted with the crude alcohol prior to distillation in order to effect purification, particularly of acidic materials and ester products derived from formic acid. Although the caustic process can be applied to more or less "finished" alcohol products, it is considered best practice from an economic viewpoint to caustic wash prior to distillation since in any event a distillation step is necessary as a clean-up operation following the caustic washing. The caustic treatment is preferably applied immediately or as soon as convenient following the production of the crude alcohol in the hydrogenation stage. This prevents the formation of additional condensed impurities such as acetals which are believed to be produced at least partly as a result of the catalytic activity of acidic impurities in the alcohol.

The caustic most suitable for the treatment is an aqueous sodium hydroxide solution of 10% concentration although caustic concentrations of the range of 5% to 25% can be employed. Very low concentrations cause emulsion formation. Potassium hydroxide can also be used. Although it is best to employ the caustic in solution, it is also possible to use solid sodium or potassium hydroxide as the treating material. In some instances for better contact by solubility of the alcohol phase and the treating solution a non-aqueous solution of the caustic can be employed, as an alcohol solution. The terms caustic and alkali as used herein are intended to have their usual meaning as applied in chemical and general industrial operations. The terms are intended to include particularly aqueous solutions of the alkali metal hydroxides, which form soluble alkali metal compounds of various alcohol impurities. These soluble compounds are removed from the alcohol either as dissolved substances in the aqueous caustic wash or during subsequent washing.

During the treatment step certain impurity constituents and particularly acidic and ester compounds which are in the alcohol are transformed, into materials which are soluble in the aqueous media. These soluble impurities pass into said media when the alcohol is treated with the caustic solution.

The caustic solution should be contacted with the crude alcohol being treated in such a manner as to assure very fast and thorough mixing of the two phases, but at the same time avoiding emulsion formation. It may be advantageous to add an emulsion inhibitor in order to prevent subsequent difficulties in separation of the two phases. For continuous operations a countercurrent tower extraction process can be employed although for best results an orifice or baffle type mixer which gives very intimate contact is considered to be the best. Some types of propeller mixers are also suitable.

The time of contact necessary to produce a good quality alcohol by removal of substantially all or at least the most undesirable impurities, varies, depending on the concentration and kind of impurities in the alcohol as well as on the concentration and temperature conditions of the caustic washing solution. For instance, the stronger the caustic solution and the higher the temperature, the less time of contact required for obtaining excellent quality alcohol. A contact time of a minute or less has been found effective while with less drastic treating conditions and more impure alcoholic feed stock the time for effective treatment may be lengthened to 1 to 3 hours.

The temperature at which the treating operation is carried out is considered to be critical in that a sufficiently elevated temperature must be employed in order to provide a treating operation which will yield maximum results in product quality improvement. Markedly better results are manifested when the caustic washing operation is carried out at temperatures above 150° F. and preferably between 175° F. and 400° F. The optimum treating temperature is directly related to the time of contact as well as to the amount and kind of impurities which are present in the original crude alcohol.

The ratio of caustic solution to the particular quantity of alcohol employed in the treating operation is not critical, however, it is of prime importance to use sufficient caustic to effect removal of substantially all the alkali sensitive impurities. Thus, there must be enough alkali to form salts with acidic sulfur containing impurities, to hydrolyze the esters present and to remove as soluble salts the acids so formed during the hydrolysis. A large excess will be uneconomical and can cause loss of alcohol product. Generally, for a crude oxo alcohol, an amount of aqueous caustic of 10 to 25% by volume based on the alcohol is satisfactory.

The treatment can generally be carried out at or near atmospheric pressure. However, specifically in the production of octyl alcohols, if the operation is done using crude alcohol at 300-350° F. then some pressure will be necessary to keep unreacted olefins and hydrocarbons from the oxonation stage in liquid phase since they boil about 200° F. Superatmospheric pressures of from 50 to 100 p. s. i. are adequate. If high temperature treatments are used, superatmospheric pressures may be necessary to keep the alcohol itself in a liquid state. The crude is rendered relatively free of normally gaseous byproducts by a degassing operation prior to the caustic washing; this degassing removes hydrogen, low boiling hydrocarbons and some hydrogen sulfide.

It is contemplated to be within the scope of this invention to carry out successive caustic treatments on the alcohol. Since, in the majority of instances the alcohol undergoing treatment will be water-immiscible; and, therefore, relatively insoluble in the caustic wash solution, the alcohol and caustic mixture is taken to a phase separator or settling tank in which there are formed two phases, an aqueous caustic phase containing the dissolved impurities removed from the alcohol, and an organic phase of the purified alcohol.

The aqueous phase is separated and reused as wash liquid, if desired, and the alcohol, by the preferred mode of operation, is subjected to at least one water washing to remove last traces of caustic and solubilized impurities. The washing operation is especially necessary if the next step is to be a distillation or rectification of the alcohol since during distillation, the alkali content of the oxo alcohol should be held to a minimum to avoid plugging of the distillation equipment by mechanical deposition.

The types of alcohol feed stock best adapted and generally those most requiring this type of specific caustic treatment are crude alcohol mixtures derived from the so-called oxo process and are water-immiscible. This range generally includes alcohols above $C_5$ and up to those of the $C_{16}$ range. It is contemplated that the process will have the widest application to purify oxo alcohols of the $C_8$ and $C_9$ range which are exactly those alcohols of most useful and desirable properties for making ester plasticizers. For instance a typical $C_8$ feed stock which can be purified by this caustic treatment to give a product yielding an ester plasticizer of high purity and both decreased color and odor problems may be characterized as one produced from the Oxo synthesis using a $C_7$ olefin feed, the resulting crude alcohol having a boiling range of 150° F. to 400° F.; and consisting essentially of 25% saturated hydrocarbons, 60% alcohol boiling at 350°-372° F. and 15% bottoms. The alcohols are branched chain isomers of octyl alcohol and are of the primary class.

A crude iso-octyl alcohol product having the above outlined characteristics is continuously extracted in an orifice mixing unit with 10% aqueous sodium hydroxide solution at an average temperature of 175° F. The average contact time of the alcohol with the alkali is 30 seconds. Following the caustic scrubbing, the alcohol is water washed, and distilled.

The alcohol fraction so obtained is employed in the standard esterification reaction by refluxing for one hour with phthalic anhydride to prepare dioctyl phthalate with successive recycles of the excess alcohol. The data reported below in Table I shows the distinct improvement in alcohol quality which resulted from the caustic treatment as shown by the marked color improvement of the ester made, especially in the second and third alcohol recycle reactions. The odor of the ester was also decidedly improved by the caustic treatment.

TABLE I

*Caustic treatment of iso-octyl alcohol*

|  | Hazen Ester Color | | |
|---|---|---|---|
|  | Cycle 1 | Cycle 2 | Cycle 3 |
| Run 1: | | | |
| Untreated alcohol | 250 | 260 | 500+ |
| Caustic treated alcohol using Fresh Caustic | 90 | 135 | 135 |
| Run 2: | | | |
| Untreated alcohol | 180 | 400 | 500++ |
| Caustic treated alcohol using Fresh Caustic | 110 | 150 | 500 |
| Run 3: | | | |
| Untreated alcohol | 160 | 200 | 225 |
| Caustic treated alcohol using Spent Caustic containing no free NaOH | 225 | 255 | 275 |

It should be noted that spent caustic, containing no free sodium hydroxide gives no improvement in ester color when used as a scrubbing solution for the crude alcohol.

|  | Spent caustic analysis gram mols/liter |
|---|---|
| Dissolved NaOH | Nil |
| Dissolved $Na_2CO_3 + Na_2S$ | [1]0.62 |
| Dissolved $NaHCO_3 + NaHS$ | [1]0.87 |
| Dissolved Na formate | 0.59 |
| Dissolved Na naphthenate | 0.01 |
| Suspended crystalline $NaHCO_3$ | 0.87 |
| Total | 2.96 |
| Caustic as charged—NaOH | 2.9 |

[1] 1.37 g. mols $CO_2$ per liter, leaving 0.12 g. mols $H_2S$ per liter.

These data show that the chief impurities removed are acid sulfur impurities taken out as sodium sulfide and sodium hydrosulfide and formate esters which are saponified and removed as sodium formate. A relatively large amount of carbon dioxide is also absorbed by the caustic. Any acids released as products by saponification are effectively removed by the caustic as the soluble sodium salts. Thus it is quite important to control the caustic as to use sufficient alkali in the washing operation to accomplish the purification results and yet not have a large excess which would be uneconomical and cause further contamination of the alcohol.

The following Table II shows the improved product qualities of iso-octyl alcohol distilled from a crude alcohol which was treated at 175° F. and at 350° F. with a 10% aqueous caustic solution for about one hour.

TABLE II

*Effect of temperature of the caustic treatment*

|  | Untreated | Treated at 175° F. | Treated at 350° F. |
|---|---|---|---|
| Treating Solution |  | 10% NaOH | 10% NaOH |
| Time, hrs |  | 1 | 1 |
| Carbonyl No | 10 | 9 | 7 |
| Combined Carbonyl No | 2 | 1 | 0.5 |
| Hydroxyl No | 416 | 419 | 426 |
| Saponification No | 10 | 2 | <1 |

From the above Table II it is apparent that the caustic treatment had little or no effect on the carbonyl compounds present, that is, the aldehydes are not removed or converted to non-carbonyl derivatives to any appreciable extent. This indicates essentially no aldolization of aldehydes takes place, under the controlled washing conditions. It is clear, however, from the above data that the ester content of the alcoholic product is quite substantially decreased by a saponification of the ester to alcohol which can be recovered as additional product and an organic acid which will be removed by the caustic. From the composition of the spent caustic as shown above it would seem that a substantial portion of the esters undergoing saponification are of the formate type. These formic acid esters are troublesome as color formers as well as corrosive agents in the alcohol and plasticizer ester products. The formate esters have been found to occur in both oxo aldehyde and oxo alcohol products and are particularly hard to remove by other purification techniques, as by distillation, since they boil in a relatively close range to both the alcohols and aldehydes and pass overhead with the iso-octyl alcohol during its distillation. It is a special advantage and feature of this invention that these formic acid esters when subjected to washing with an aqueous solution of alkali metal hydroxide, especially at elevated temperatures, are substantially completely hydrolyzed to formic acid and iso-octyl alcohol. The formic acid is removed in the alkali metal hydroxide solution as the alkali metal salt and the iso-octyl alcohol is freed and increases the quantity of alcohol product available.

The treating will also remove the organic acidic compounds as well as acidic type sulfur impurities particularly hydrogen sulfide. Hydrogen sulfide, which if allowed to remain in the alcohol may be oxidized to free sulfur as an undesirable imurity in the final alcohol product, will be removed by a caustic treatment. In addition, certain non-acidic sulfur compounds, which are known to be color producing bodies, will be removed in more limited amounts.

Such caustic treatment has little or no effect on acetals, and ethers as may be present and which frequently are of higher molecular weight than the alcohol. Thus a caustic step alone will not give a total alcohol product of very narrow boiling range since there will still be a portion of high boiling ends left in the product even though the esters are removed. However, substantially all of the products active in causing deleterious odor and color effects are effectively removed during the caustic treatment.

Furthermore, a number of these high boiling impurities are conveniently removed by distillation, hence, it is of particular advantage to combine the caustic scrubbing operation with distillation and possibly other purification procedures as are required for the particular impurities present in the crude product being handled. It may be of particular value to employ a special treatment to remove residual aldehydes and carbonyl compounds in general, as for instance by an aqueous bisulfite extraction process.

Other modifications and modes of applications within the spirit of the invention will be apparent to those skilled in the art.

What is claimed is:

A process for the treatment of a crude, water-immiscible primary, branched chain iso-octyl alcohol produced by the Oxo reaction followed by hydrogenation, giving a crude product, predominantly alcoholic and containing impurities including sulfur compounds, acids, esters and particularly formic acid esters which comprises liquid phase contacting of the crude alcohol at least once prior to distillation with an aqueous solution of an alkali metal hydroxide from 5 to 25% concentration at temperatures between 175° F. and 400° F., stratifying the mixture into a lower aqueous layer containing dissolved alkali metal hydroxide salts of organic impurities and an upper purified alcohol layer, separating the thus purified alcohol from the aqueous layer, water washing the separated alcohol free of caustic and dissolved alkali metal compounds, and subjecting the washed alcohol to distillation to give a purified alcohol distillate product, free of esters and acids.

WARREN M. SMITH.

REFERENCES CITED

The following references are of record in the file of this patent:

UNITED STATES PATENTS

| Number | Name | Date |
|---|---|---|
| 1,833,331 | Park | Nov. 24, 1931 |
| 1,979,303 | Woodhouse | Nov. 6, 1934 |
| 2,139,179 | Tulleners | Dec. 6, 1938 |
| 2,188,274 | Bump | Jan. 23, 1940 |
| 2,451,857 | Miskel et al. | Oct. 19, 1948 |
| 2,486,693 | Spijker et al. | Nov. 1, 1949 |

OTHER REFERENCES

U. S. Naval Tech Mission in Europe "The Synthesis of Hydrocarbons and Chemicals from CO and $H_2$," pp. 84–85, August 2, 1946.

Fiat Final Report No. 1000 "The OXO Process," PB–81,383, pp. 40–41, December 26, 1947.